(12) United States Patent
Niewiadomski et al.

(10) Patent No.: US 11,511,733 B2
(45) Date of Patent: Nov. 29, 2022

(54) VEHICLE PARKING SYSTEM

(71) Applicant: Ford Global Technologies, LLC, Dearborn, MI (US)

(72) Inventors: Luke Niewiadomski, Dearborn, MI (US); Lihui Chen, Rochester, MI (US); Li Xu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 351 days.

(21) Appl. No.: 16/689,120

(22) Filed: Nov. 20, 2019

(65) Prior Publication Data

US 2021/0146915 A1    May 20, 2021

(51) Int. Cl.
| | |
|---|---|
| *B60W 30/06* | (2006.01) |
| *G06T 7/13* | (2017.01) |
| *G06T 7/50* | (2017.01) |
| *G06T 7/60* | (2017.01) |
| *G06T 7/70* | (2017.01) |
| *G06V 20/58* | (2022.01) |
| *B60W 10/04* | (2006.01) |
| *B60W 10/18* | (2012.01) |
| *B60W 10/22* | (2006.01) |

(Continued)

(52) U.S. Cl.
CPC ............... *B60W 30/06* (2013.01); *G06T 7/13* (2017.01); *G06T 7/50* (2017.01); *G06T 7/60* (2013.01); *G06T 7/70* (2017.01); *G06V 20/586* (2022.01); *B60W 10/04* (2013.01); *B60W 10/18* (2013.01); *B60W 10/20* (2013.01); *B60W 10/22* (2013.01); *B60W 2552/00* (2020.02); *B60W 2710/18* (2013.01); *B60W 2710/20* (2013.01); *B60W 2710/22* (2013.01); *G01S 17/931* (2020.01); *G06T 2207/30264* (2013.01)

(58) Field of Classification Search
CPC ...... B60W 30/06; B60W 10/04; B60W 10/18; B60W 10/20; B60W 10/22; B60W 2552/00; B60W 2710/18; B60W 2710/20; B60W 2710/22; B60W 40/02; B60W 2552/50; B60W 2554/20; B60W 2710/06; B60W 2710/08; G06T 7/13; G06T 7/50; G06T 7/60; G06T 7/70; G06T 2207/30264; G06T 2207/10028; G06V 20/586; G01S 17/931; G01S 2015/932; G01S 15/931; G01S 2013/9314; G01S 7/4802; G01S 13/931; B62D 15/027; B62D 15/0285

See application file for complete search history.

(56) References Cited

U.S. PATENT DOCUMENTS 9,718,404 B2    8/2017 Nallapa et al.
10,179,590 B2 *  1/2019 Lavoie ............ B60W 30/18027
(Continued)

*Primary Examiner* — Frederick M Brushaber
(74) *Attorney, Agent, or Firm* — Frank A. MacKenzie; Bejin Bieneman PLC

(57) ABSTRACT

A system, comprising a computer having a processor and a memory storing instructions executable by the processor to identify a height of a curb that is at least one of within or bordering a parking area having a specified length and width. The instructions include instructions to identify a location of the curb. The instructions include instructions to determine a parking position within the parking area based on the height of the curb and the location of the curb. The instructions include instructions to park a vehicle at the parking position within the parking area.

20 Claims, 4 Drawing Sheets

(51) Int. Cl.
*B60W 10/20* (2006.01)
*G01S 17/931* (2020.01)

(56) References Cited

U.S. PATENT DOCUMENTS

| | | | |
|---|---|---|---|
| 2014/0195114 A1* | 7/2014 | Tseng | B60G 17/0165 |
| | | | 701/1 |
| 2014/0347470 A1* | 11/2014 | Zhang | G06T 3/4038 |
| | | | 382/104 |
| 2018/0170366 A1 | 6/2018 | Fukushima et al. | |
| 2018/0339702 A1 | 11/2018 | Kim | |
| 2019/0073902 A1 | 3/2019 | Indoh et al. | |
| 2020/0047667 A1* | 2/2020 | Ji | B60Q 9/008 |

* cited by examiner

VEHICLE PARKING SYSTEM

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

Present route planning and object avoidance techniques for autonomously operating a vehicle, i.e., at SAE level 2 or above, suffer from deficiencies for parking a vehicle. For example, a vehicle may contact a curb when pulling too far into a parking area, and/or may not pull far enough into the parking area when stopping short of the curb.

DETAILED DESCRIPTION

Figure 1:
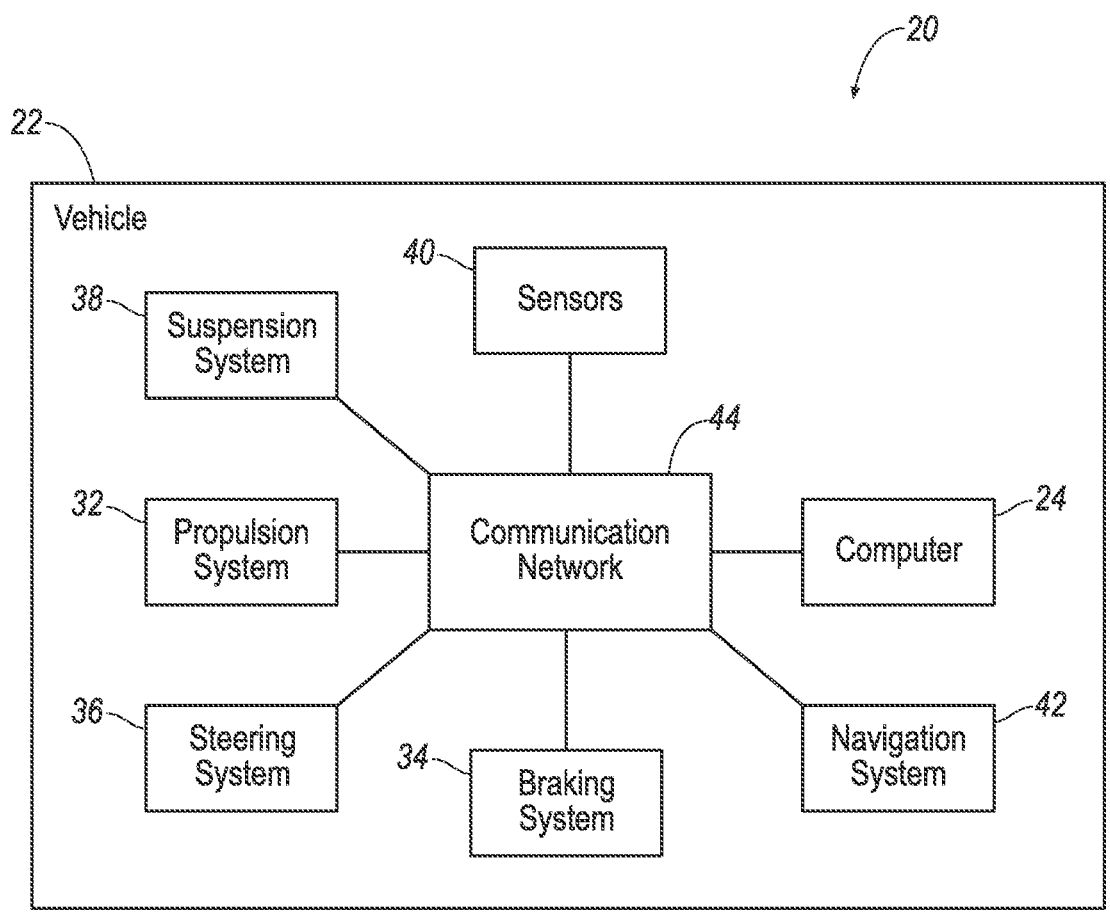
FIG. 1 is a block diagram of components of a vehicle.

A system includes a computer having a processor and a memory storing instructions executable by the processor to identify a height of a curb that is at least one of within or bordering a parking area having a specified length and width. The instructions include instructions to identify a location of the curb. The instructions include instructions to determine a parking position within the parking area based on the height of the curb and the location of the curb. The instructions include instructions to park a vehicle at the parking position within the parking area.

The instructions may include instructions to identify the location of the curb including a distance between an edge of the parking area and the curb.

The instructions may include instructions to determine whether to park the vehicle in the parking area in a forward direction or a reverse direction based on the height of the curb.

The instructions may include instructions to determine whether to park the vehicle in the parking area in the forward direction or the reverse direction based on a front ground clearance and a rear ground clearance of the vehicle.

The instructions may include instructions to determine the parking position based on a ground clearance of the vehicle.

The ground clearance may be a front ground clearance or a rear ground clearance.

The instructions may include instructions to select the front ground clearance or the rear ground clearance for determining the parking position based on whether the vehicle is traveling in a forward direction or a reverse direction.

The instructions may include instructions to determine the parking position based on an overhang length of a front of the vehicle or a rear of the vehicle.

The instructions may include instructions to limit output torque of a propulsion system of the vehicle upon determining the vehicle is within a threshold distance of the curb.

The instructions to limit output torque of the propulsion system may include instructions to limit the output torque to an amount that is less than an amount necessary for driving the vehicle over the curb.

The instructions may include instructions to determine whether the vehicle is sufficiently within the parking area by comparing a present location of the vehicle with the parking position.

The instructions may include instructions to identify one or more edges of the parking area based on data from a camera or a LIDAR.

The instructions may include instructions to identify the one or more edges of the parking area based on a paint line or an object detected by the camera or LIDAR.

A method includes identifying a height of a curb that is at least one of within or bordering a parking area having a specified length and width. The method includes identifying a location of the curb. The method includes determining a parking position within the parking area based on the height of the curb and the location of the curb. The method includes parking a vehicle at the parking position within the parking area.

The location of the curb may include a distance between an edge of the parking area and the curb.

The method may include determining whether to park the vehicle in the parking area in a forward direction or a reverse direction based on the height of the curb and based a front ground clearance and a rear ground clearance of the vehicle.

The method may include selecting a front ground clearance or a rear ground clearance for determining the parking position based on whether the vehicle is traveling in a forward direction or a reverse direction.

The method may include determining the parking position based on an overhang length of one of a front of the vehicle or a rear of the vehicle.

The method may include limiting output torque of a propulsion system of the vehicle upon determining the vehicle is within a threshold distance of the curb.

The method may include limiting output torque of the propulsion system to an amount that is less than an amount necessary for driving the vehicle over the curb.

The method may include determining whether the vehicle is sufficiently within the parking area by comparing a present location of the vehicle with the parking position.

The method may include identifying one or more edges of the parking area based on data from a camera or a LIDAR.

The method may include identifying the one or more edges of the parking area based on a paint line or an object detected by the camera or LIDAR.

A computer readable medium may store instructions executable by a processor to execute the method.

A system may include a computer having a processor and a memory storing instructions executable by the processor to perform the method.

A vehicle may include a computer having a processor and a memory storing instructions executable by the processor to perform the method.

The instructions may include instructions to operate the vehicle in an autonomous mode.

The vehicle may include a sensor, a propulsion system, a braking system, and a steering system in communication with the computer.

Figure 2:
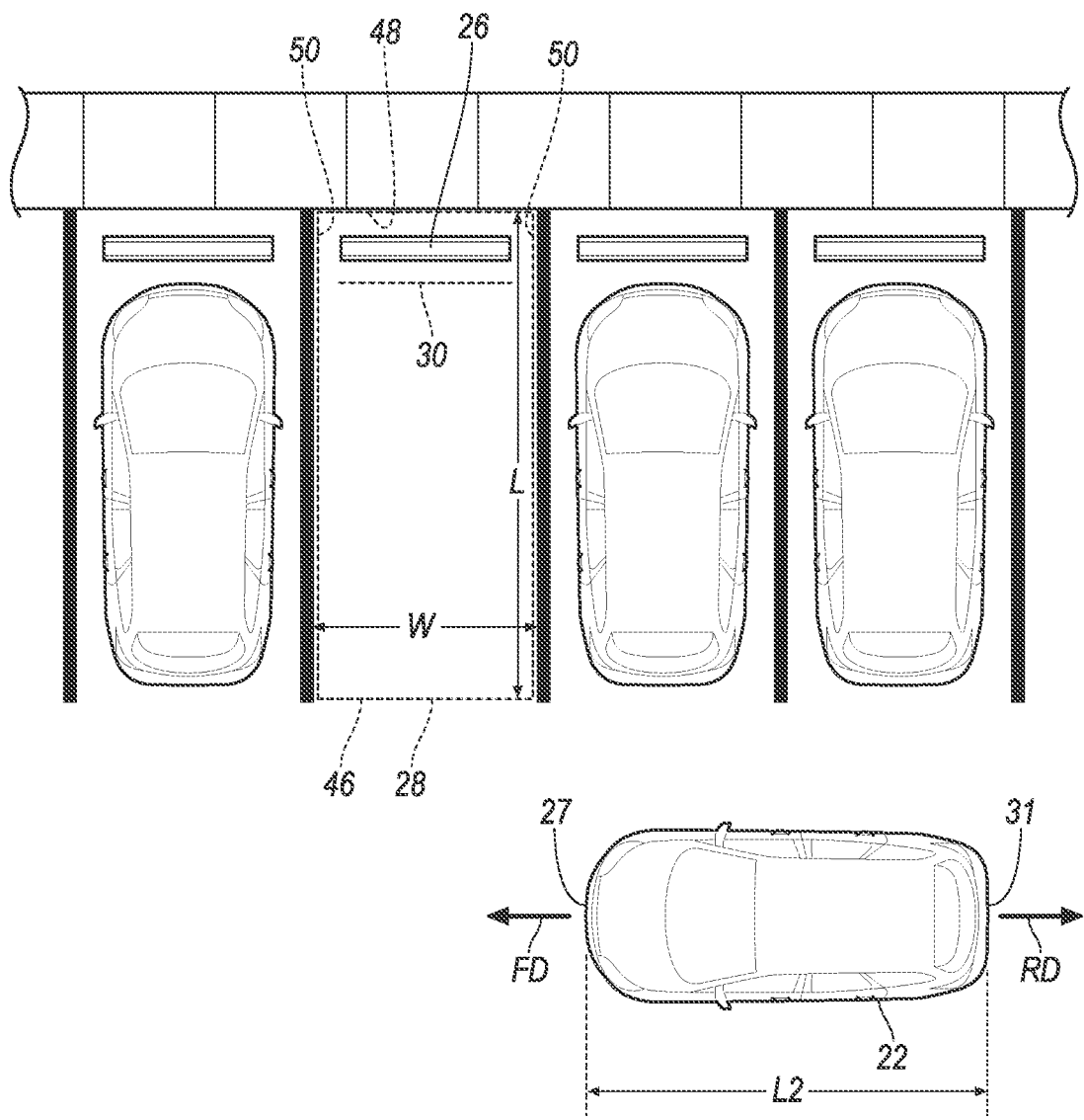
FIG. 2 is a top view of a parking scene with a vehicle proximate to a parking area.
Figure 3:
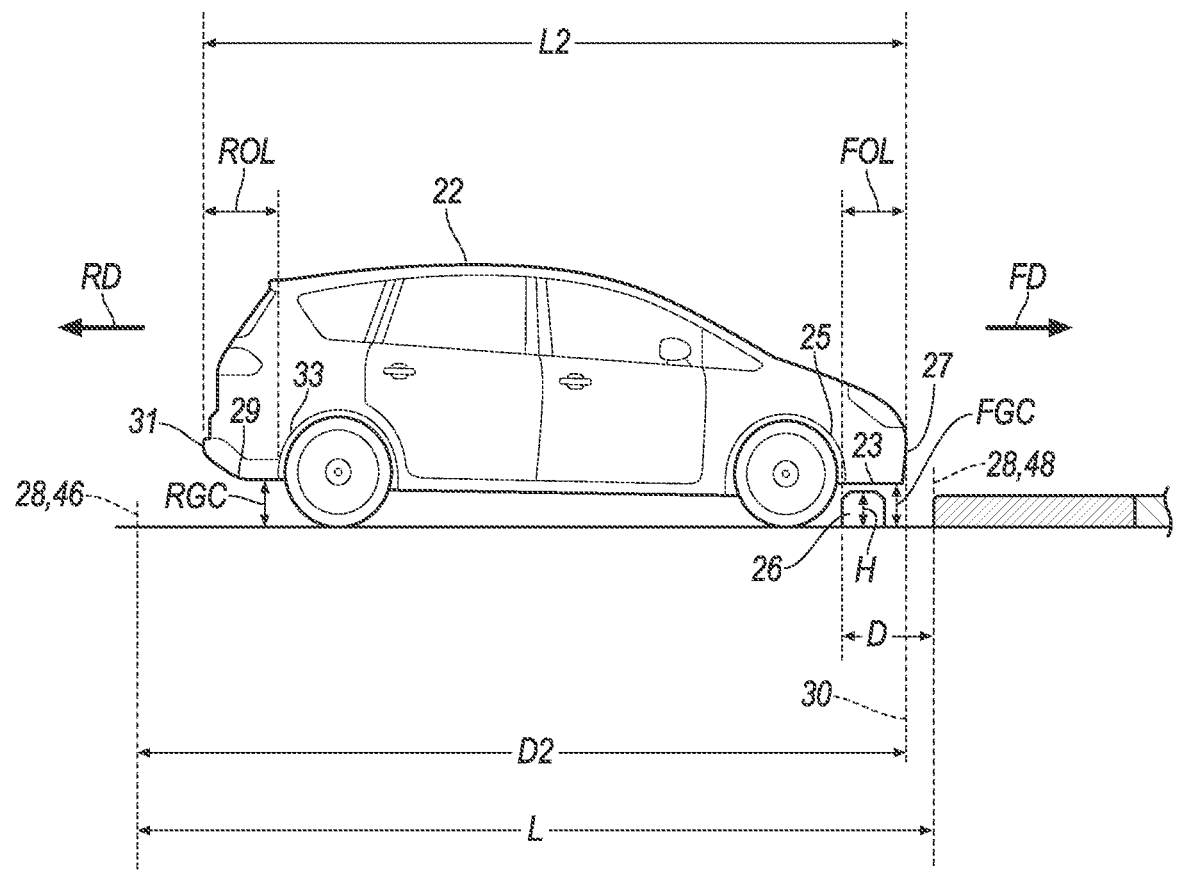
FIG. 3 is a side view of the vehicle parked at a parking position in the parking area.

With reference to FIGS. 1-3, wherein like numerals indicate like parts throughout the several views, a system 20 for parking a vehicle 22 includes a computer 24 having a processor and a memory storing instructions executable by the processor to identify a height H of a curb 26 that is at least one of within or bordering a parking area 28 defined by a specified length L and width W. The instructions include instruction to identify a location of the curb 26. The instructions include instructions to determine a parking position 30 within the parking area 28 based on the height H of the curb 26 and the location of the curb 26. The instructions include instructions to park the vehicle 22 at the parking position 30 within the parking area 28.

The system 20 parks the vehicle 22 within the parking area 28 e.g., such that the vehicle 22 is proximate a rear edge 48 of the parking area 28 and does not contact the curb 26 or overlap the rear edge 48.

The vehicle 22 may be any type of passenger or commercial automobile such as a car, a truck, a sport utility vehicle, a crossover vehicle, a van, a minivan, a taxi, a bus, etc. In this description, relative orientations and directions are from the perspective of an occupant seated in a driver seat, facing a dashboard of a vehicle.

The vehicle 22 may operate in an autonomous mode, a semiautonomous mode, or a nonautonomous mode. For purposes of this disclosure, an autonomous mode is defined as one in which each of a propulsion system 32, a braking system 34, and a steering system 36 of the vehicle 22 are controlled by the computer 24; in a semiautonomous mode the computer 24 controls one or two of the propulsion system 32, the braking system 34, and the steering system 36; in a nonautonomous mode, a human operator controls the propulsion system 32, the braking system 34, and the steering system 36. In some examples, the non-autonomous mode of operation may refer to SAE levels 0-1, the semi-autonomous mode of operation may refer to SAE levels 2-3, and the autonomous mode of operation may refer to SAE levels 4-5

With reference to FIG. 3, the vehicle 22 includes a front overhang 23 that extends from front wheel wells 25 of the vehicle 22 in a forward direction FD to a front 27 of the vehicle 22. The front overhang 23 defines a front overhang length FOL between the front wheel well 25 and the front 27 of the vehicle 22. The vehicle 22 includes a rear overhang 29 that extends from rear wheel wells 33 of the vehicle 22 in a reverse direction RD to a rear 31 of the vehicle 22. The rear overhang 29 defines a rear overhang length ROL between the rear wheel well 29 and the rear 31 of the vehicle 22.

The propulsion system 32 of the vehicle 22, illustrated in FIG. 1, translates stored energy into motion of the vehicle 22. The propulsion system 32 provides motion to the vehicle 22 by generating output torque that may cause rotation of wheels of the vehicle 22. The propulsion system 32 may be a conventional vehicle propulsion system, for example, a conventional powertrain including an internal-combustion engine coupled to a transmission that transfers output torque to wheels; an electric powertrain including batteries, an electric motor, and a transmission that transfers output torque to the wheels; a hybrid powertrain including elements of the conventional powertrain and the electric powertrain; or any other type of propulsion. The propulsion system 32 is in communication with and receives input from the computer 24 and may receive input from a human driver. The human driver may control the propulsion system 32 via, e.g., an accelerator pedal and/or a gear-shift lever.

The braking system 34 resists the motion of the vehicle 22 to thereby slow and/or stop the vehicle 22. The braking system 34 may include friction brakes such as disc brakes, drum brakes, band brakes, and so on; regenerative brakes; any other suitable type of brakes; or a combination. The braking system 34 is in communication with and receives input from the computer 24 and may receive input from a human driver. The human driver may control the braking system 34 via, e.g., a brake pedal.

The steering system 36 controls turning, i.e., a steering angle, of wheels of the vehicle 22. The steering system 36 may be a rack-and-pinion system with electric power-assisted steering, a steer-by-wire system, or any other suitable system. The steering system 36 is in communication with and receives input from a steering wheel and the computer 24.

The vehicle 22 includes a suspension system 38 that controls vertical movement of wheels of vehicle 22 relative to a body and frame of the vehicle 22. The suspension system 38 may include shocks, struts, springs, etc., connecting the wheels to the body and frame. The suspension system 38 may be a height adjustable suspension that can vary a front ground clearance FGC and a rear ground clearance RGC of the vehicle 22 (illustrated in FIG. 3), e.g., by raising or lowering the body and frame relative to the wheels. The suspension system 38 may vary the ground clearance FGC, RGC by increasing or decreasing pneumatic or hydraulic pressure of air springs or hydraulic springs of the suspension system 38. The suspension system 38 may include electric chips, circuits, sensors, electric control modules (ECUs), etc., to control the suspension system 38, e.g., in response to a command from the computer 24, a user interface, etc.

The suspension system 38 may generate data specifying the rear ground clearance RGC and/or the front ground clearance FGC of the vehicle 22 as controlled by the suspension system 38. For example, the suspension system 38 may include one or more sensors that detect a position of components of the suspension system 38, e.g., a length and/or amount of extension of a shock. The suspension system 38 may generate data specifying the rear ground clearance RGC and/or the front ground clearance FGC of the vehicle 22 based on data from such sensor, e.g., according to data stored in a lookup table or the like specifying a ground clearance at a specified extension or range of extensions of a shock. The suspension system 38 may use data from such sensor to control the suspension system 38, e.g., to provide the ground clearance FGC, RGC commanded by the computer 24 and using a conventional feedback loop. The suspension system 38 may generate data specifying the rear ground clearance RGC and/or the front ground clearance FGC of the vehicle 22 specifying the ground clearance FGC, RGC is as commanded by the computer 24.

The vehicle 22 includes sensors 40. The sensors 40 may detect internal states of the vehicle 22, for example, wheel speed, wheel orientation, and engine and transmission variables. The sensors 40 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 40 may detect the external world, for example, radar sensors, scanning laser range finders, light detection and ranging (LIDAR) devices, and image processing sensors such as cameras. The sensors 40 may include communications devices, for example, vehicle-to-infrastructure (V2I) or vehicle-to-vehicle (V2V) devices.

The vehicle 22 may include a navigation system 42. The navigation system 42 is implemented via circuits, chips, or other electronic components that can determine a present location of the vehicle 22. The navigation system 42 may be implemented via satellite-based system such as the Global Positioning System (GPS). The navigation system 42 may triangulate the location of the vehicle 22 based on signals received from various satellites in the Earth's orbit. The navigation system 42 is programmed to output signals representing the present location of the vehicle 22 to, e.g., the computer 24 via a communication network 44. In some instances, the navigation system 42 is programmed to determine a route from the present location to a future location. The navigation system 42 may access a map stored in memory and develop the route according to the map data. The map may include data specifying lanes of roads of the map, e.g., including turn lanes, a direction of traffic flow for the lanes, etc. The map may include parking areas 28, e.g., including data specifying GPS coordinates or other location datum, the length L and width W of the parking area 28, and a parking direction (i.e., the forward direction FD or the reverse direction RD) for the parking area 28.

The communication network 44 includes hardware, such as a communication bus, for facilitating communication among components of the vehicle 22. The communication network 44 may facilitate wired or wireless communication among the components, e.g., the computer 24, the sensors 40, the navigation system 42, the braking system 34, the propulsion system 32, the steering system 36, the suspension system, 38, etc., in accordance with a number of communication protocols such as controller area network (CAN), Ethernet, WiFi, Local Interconnect Network (LIN), and/or other wired or wireless mechanisms.

The computer 24, implemented via circuits, chips, or other electronic components, is included in the vehicle 22 for carrying out various operations, including as described herein. The computer 24 is a computing device that generally includes a processor and a memory, the memory including one or more forms of computer-readable media, and storing instructions executable by the processor for performing various operations, including as disclosed herein. The memory of the computer 24 further generally stores remote data received via various communications mechanisms; e.g., the computer 24 is generally configured for communications on a controller area network (CAN) bus or the like, and/or for using other wired or wireless protocols, e.g., Bluetooth, etc. The computer 24 may also have a connection to an onboard diagnostics connector (OBD-II). Via the communication network 44 using Ethernet, WiFi, the CAN bus, Local Interconnect Network (LIN), and/or other wired or wireless mechanisms, the computer 24 may transmit messages to various devices in the vehicle 22 and/or receive messages from the various devices, e.g., the computer 24, the sensors 40, the navigation system 42, the braking system 34, the propulsion system 32, the steering system 36, the suspension system 38, etc. Although one computer 24 is shown in FIG. 1 for ease of illustration, it is to be understood that the computer 24 could include, and various operations described herein could be carried out by, one or more computing devices.

The computer 24 is be programmed to, i.e., the memory stores instructions executable by the processor to, identify the parking area 28 (illustrated in FIGS. 2 and 3). The parking area 28 is a specified area that is for parking the vehicle 22, e.g., the parking area 28 may be a conventional parking space in a parking lot. The parking area 28 has the specified length L and width W, e.g., in meters. The length L and width W extend along edges 46, 48, 50 defining an outer border of the parking area 28. The edges 46, 48, 50 include a front edge 46, the rear edge 48, and side edges 50. The front edge 46 is elongated along the width W. A vehicle 22 may enter and/or exit the parking area 28 from the front edge 46. The rear edge 48 is elongated along the width W. The curb 26 may be at or proximate the rear edge 48 (i.e., closer to the rear edge 48 that the front edge 46). The side edges 50 may be elongated along the length L.

The computer 24 may identify the parking area 28 based on data from the navigation system 42, e.g., the computer 24 may select the parking area 28 from those included in the map. The computer 24 may select one of the parking areas 28 from the map based on a proximity of the parking area 28 to the vehicle 22, e.g., the computer 24 may select the closest parking area 28. The computer 24 may identify the parking area 28 based on data from the sensors 40. Image data from a camera may be used to identify the edges 46, 48, 50 of the parking area 28. For example, the computer 24 may use conventional image recognition techniques to identify paint lines on the ground that are spaced from each other by the width W and define the side edges 50 of the parking area 28. The lanes are elongated along the length L of the parking area 28. The spacing between distal ends of the lines may define the length L. The computer 24 may identify changes in surface material in the images as defining one or more of the edges 46, 48, 50 of the parking area 28, e.g., the edges 46, 48, 50 may extend along a border between a paved surface and an unpaved surface, between asphalt surface and concrete surface, gravel surface and grass surface, etc. Point cloud data from a LIDAR sensor may be used to identify edges 46, 48, 50 of the parking area 28. For example, objects (such as vehicles, walls, fences, signs, etc.) may be identified in the point cloud data, e.g., using conventional object detection techniques. The computer 24 may identify the edges 46, 48, 50 of the parking area 28 as being a predetermined distance away from such objects. For example, the computer 24 may identify the side edges 50 of the parking area 28 by using a vehicle identified in the point cloud data and parked adjacent to the parking area 28 as a datum, identifying the side edges 50 as being spaced a predetermined distance from such datum. The predetermined distance may be based on an average amount of space required to open and closes doors of a vehicle 22, e.g., 1 meter. The predetermined distance may be empirically determined and stored in the memory. The computer 24 may define the edges 46, 48, 50 of the parking area 28 based on changes in ground surface height identified in the point cloud data. For example, a change in height between a parking lot and an adjacent sideway may be identified in the point cloud data and define one or more edges 46, 48, 50 of the parking area 28.

The computer 24 may iteratively identify the parking area 28, i.e., updating the edges 46, 48, 50 of the parking area 28 over time, e.g., as more data is collected by the computer 24. For example, the computer 24 may identify the parking area 28 as one of the parking areas 28 in the map when there are not any parking areas 28 within range of the sensors 40 of the vehicle 22. Once the parking area 28 selected from those in the map is within range of the sensors 40 of the vehicle 22, e.g., after the vehicle 22 has navigated closer to the selected parking area 28, the computer 24 may re-identify one or more of the edges 46, 48, 50 of the parking area 28 based on data from the sensors 40.

The computer 24 is programmed to identify the curb 26 that is at least one of within or bordering the parking area 28. The curb 26 restricts motion of a vehicle 22 in the parking area 28 by providing a physical barrier that has an increased elevation relative to a surface of the parking area 28. The curb 26 may be elongated along the width W of the parking area 28. The curb 26 may be concrete or any suitable solid material of sufficient strength to resist movement of the vehicle 22, e.g., when such vehicle 22 contacts the curb 26. The computer 24 may identify the curb 26 based on data from the sensors 40. Image data from a camera may be used to identify the curb 26. For example, the computer 24 may use conventional image recognition techniques to identify the curb 26 in the image data. As another example, the computer 24 may identify the curb 26 in the point cloud data, e.g., using conventional techniques.

The computer 24 is programmed to identify a location of the curb 26 relative to the parking area 28. The computer 24 may identify the location relative to the edges 46, 48, 50. The curb 26 borders the parking area 28 when the curb 26 is at one of the edges 46, 48, 50 of the parking area 28. The computer 24 may identify the location of the curb 26 by comparing the edges 46, 48, 50 of the parking area 28 identified with data from the sensors 40 with the curb 26 identified with data from the sensors 40. The location of the curb 26 may include a distance D (illustrated in FIG. 3) between one of the edges 46, 48, 50 of the parking area 28 and the curb 26. For example, the distance D may be between the rear edge 48 and a portion of the curb 26 furthest from the rear edge 48 along the length L of the parking area 28. The computer 24 may use conventional stereo camera analysis to identify the location of the curb 26. For example, the computer 24 may compare a position of the curb 26 in images captured by a pair of spaced-apart cameras. The computer 24 may use a difference of the positions relative to each other from the pair of cameras to identify the location of the curb 26 relative to the vehicle 22 and/or relative to other features, such as the rear edge 48, identified in the images. The computer 24 may identify the location of the curb 26 based on point cloud data from a LIDAR. For example, the computer 24 may identify planes, surfaces and other objects in the point cloud data as representing the curb 26, e.g., by analyzing the point cloud data with an artificial neural network and/or other conventional techniques. The computer 24 may identify the location of the curb 26 relative to the vehicle 22 and/or relative to other features, such as the rear edge 48, identified in the point cloud.

The computer 24 is programmed to identify the height H of the curb 26. The height H of the curb 26 is a distance between a surface supporting the curb 26, e.g., the ground surface of the parking area 28, and a top most surface of the curb 26. The computer 24 may identity the height H of the curb 26 based on data from the sensors 40. The computer 24 may identify the height H of the curb 26 based on image data and/or point cloud data using conventional techniques. For example, the computer 24 may identify the height H of the curb 26, identified with conventional image recognition techniques, based on image data by measuring the height H of the curb 26 in pixels in the image data and then determining, based on a distance of the curb, an actual height of the curb. The computer 24 may identify the height of the curb 26 with a look up table that includes various measured heights in pixels with linear distances in centimeters based on a specified distance or distances from a camera. The computer 24 may store multiple lookup tables, each table for use when the curb 26 is at a specified distance form the vehicle 22. For example, the computer 24 may store a first table for use when the curb 26 is a first distance from the vehicle 22 (e.g., 2 meters), a second table for use when the curb 26 is a second distance from the vehicle 22 (e.g., 1 meter), etc. As another example, the computer 24 may identity the height H of the curb 26 based on an amount of points in the point cloud data identified as the curb 26 that are between the ground surface of the parking area 28 and the top most surface of the curb 26. The computer 24 may identify the height H based on an altitude angle between such points and a distance of such points from the vehicle 22, e.g., using trigonometry or other conventional techniques. The altitude angle between the points may be a fixed predetermined value stored in memory. The distance from the vehicle 22 to the points may be determined using time of flight calculations, or other conventional techniques.

The computer 24 may iteratively identify the location and the height H of the curb 26 i.e., updating the distance D and the height H over time, e.g., as more data is collected by the sensors 40 and computer 24.

The computer 24 may identify the front ground clearance FGC and/or the rear ground clearance RGC of the vehicle 22. The front ground clearance FGC and the rear ground clearance RGC are vertical distances between the ground supporting the vehicle 22 and the vehicle 22 forward and rearward of the wheels, respectively. The computer 24 may identify the ground clearances FGC, RGC based on a ride height of the suspension system 38 of the vehicle 22. For example, one or more sensors of the suspension system 38 may detect positions of components of the suspension system 38 that indicate the ride height, e.g., a position of a swing arm relative to the frame and/or body, a length of a shock, etc. As another example, the computer 24 may command the suspension system 38 to control the front ground clearance FGC and/or the rear ground clearance RGC and may identify the respective ground clearances FGC, RGC as those included in such command, i.e., when the suspension system 38 is a height adjustable suspension system.

Additionally or as an alternative, the computer 24 may identify the ground clearance FGC, RGC based on data from one or more sensors 40 of the vehicle 22. For example, the computer 24 may receive data specifying the front ground clearance FGC and the rear ground clearance RGC from proximity sensors (e.g., ultrasonic and/or radar sensors supported at the front 27 and/or the rear 31 of the vehicle 22 and oriented to detect a distance from a bottom of the vehicle 22 to the ground. The computer 24 may identify the ground clearance FGC, RGC based on data from such sensors 40. Alternatively, e.g., when the vehicle 22 is not equipped to determine the ground clearance FGC, RGC based on the ride height of the suspension system 38 of the vehicle 22 or based on data from the sensors 40, the ground clearances FGC, RGC may be predetermined, e.g., by a manufacturer of the vehicle 22, and stored in memory the computer 24. The predetermined ground clearances may be minimum ground clearances of the vehicle 22, e.g., when the suspension system 38 is fully compressed. The computer 24 may identify the front ground clearance FGC and/or rear ground clearance RGC by retrieving the respective predetermined ground clearance FGC, RGC from memory.

The computer 24 may be programmed to determine whether to park the vehicle 22 in the parking area 28 in the forward direction FD or the reverse direction RD. The vehicle 22 parked in the parking area 28 in the forward direction FD enters the parking area 28 and approaches the parking position 30 in the forward direction FD, e.g., with the front 27 of the vehicle 22 proximate the rear edge 48 of the parking area 28. The vehicle 22 parked in the parking area 28 in the reverse direction RD enters the parking area 28 and approaches the parking position 30 in the reverse direction RD, e.g., with the rear 31 of the vehicle 22 proximate the rear edge 48 of the parking area 28.

The computer 24 may determine whether to park vehicle 22 in the forward direction FD or the reverse direction RD based on the height H of the curb 26 and based on the front ground clearance FGC and the rear ground clearance RGC of the vehicle 22. The computer 24 determines whether to park vehicle 22 in the forward direction FD or the reverse direction RD by comparing the height H of the curb 26 with the front ground clearance FGC and the rear ground clearance RGC of the vehicle 22. Upon determining that the height H of the curb 26 is less that the front ground clearance FGC and greater than the rear ground clearance RGC the computer 24 determines to park the vehicle 22 in the parking area 28 in the forward direction FD. Upon determining that the height H of the curb 26 is greater that the front ground clearance FGC and less than the rear ground clearance RGC the computer 24 determines to park the vehicle 22 in the parking area 28 in the reverse direction RD. Upon determining that the height H of the curb 26 is greater than front ground clearance FGC and the rear ground clearance RGC, or upon determining the height H of the curb 26 is less than the front ground clearance FGC and the rear ground clearance RGC, the computer 24 determines whether to park vehicle 22 in the forward direction FD or the reverse direction RD based on, e.g., a prestored direction or a convenience direction. The prestored direction is the forward direction FD or the reverse direction RD as predetermined and stored in memory. A manufacturer of the vehicle 22 may provide the prestored direction, e.g., based on empirical testing indicating what parking direction is most commonly used. An operator of the vehicle 22 may provide the prestored direction, e.g., via a user interface of the vehicle 22 and based on personal preference. The convenience direction is the direction, i.e., the forward direction FD or the reverse direction RD, that the vehicle 22 is traveling as the vehicle 22 approaches the parking area 28.

The computer 24 may determine whether to park vehicle 22 in the forward direction FD or the reverse direction RD based on data from the navigation system 42. For example, the computer 24 may determine to park vehicle 22 in the forward direction FD or the reverse direction RD based on the parking area 28 being specified as a parking area 28 for parking in the forward direction FD or the reverse direction RD in the map.

The computer 24 is programmed to determine the parking position 30 within the parking area 28. The parking position 30 is a position relative to the parking area 28, e.g., relative to one or more of the edges 46, 48, 50, or the curb 26, including at least a distance from the rear edge 48 or the curb 26. The parking position 30 includes a specified or determined distance from the rear edge 48 or the curb 26, and the vehicle 22 is at the parking position 30 when the front 27 or the rear 31 of the vehicle 22 (e.g., depending on whether the vehicle 22 is parking in the parking area 28 in the forward direction FD or the reverse direction RD) is at such distance from the rear edge 48 or the curb 26. The computer 24 identifies the parking position 30 such that the vehicle 22 at the parking position 30 is within the parking area 28. In other words, the computer 24 identifies the parking position 30 such that the front 27 or the rear 31 of the vehicle 22 at the parking position 30 does not extend from the parking area 28 over the rear edge 48 and such that the vehicle 22 at the parking position 30 is between the side edges 50. The computer 24 further identifies the parking position 30 such that the vehicle 22 does not contact the curb 26. In other words, the computer 24 identifies the parking position 30 based on the location of the curb 26 and based on the height H of the curb 26, i.e., such that the vehicle 22 at the parking position 30 does not contact the curb 26. The computer 24 may determine the parking position 30 as close as possible to the rear edge 48 of the parking area 28 while providing no contact between the curb 26 and the vehicle 22.

The computer 24 identifies the parking position 30 by determining whether the curb 26 borders the parking area 28, i.e., whether or not the curb 26 is at the rear edge 48 of the parking area 28. The computer 24 determines whether or not the curb 26 borders the parking area 28 by comparing the identified location of the curb 26 with the rear edge 48 of the parking area 28. The computer 24 determines the curb 26 borders the parking area 28 when the curb 26 abuts or overlaps the rear edge 48 of the parking area 28.

Upon determining that the curb 26 borders the parking area 28, the computer 24 identifies the parking position 30 as being a first distance from the rear edge 48 of the parking area 28. The first distance may be empirically predetermined, e.g., based on an amount of space sufficient to permit a pedestrian to fit between the front of the rear of the vehicle 22 at the parking position 30 and the rear edge 48 of the parking area 28, e.g. 1 meter. The first distance may be a minimum distance, e.g., that keeps the front or rear of the vehicle 22 from overlapping the rear edge 48, e.g., 0.5 meters. The computer 24 may take into account an accuracy of the sensors 40 of the vehicle 22, e.g., the first distance may be equal to a tolerance of the sensors 40. For example, when the sensors 40 can determine the distance to a detected object with +/−1 centimeter accuracy, the first distance may be 1 centimeter. The first distance may be another predetermined amount. The first distance is stored in memory of the computer 24.

The computer 24, upon determining the curb 26 does not border the parking area 28, i.e., that the curb 26 is within the parking area 28, identifies the parking position 30 based on the front ground clearance FGC or the rear ground clearance RGC of the vehicle 22. The computer 24 compares the curb 26 height H with the front ground clearance FGC or the rear ground height H, i.e., to determine whether the front overhang 23 or the rear overhang 29 may extend over the curb 26 without contacting the curb 26. In other words, the computer 24 determines whether the front overhang 23 or the rear overhang 29 are higher than the height H of the curb 26.

The computer 24 may determine the parking position 30 based on the front ground clearance FGC when the height H of the curb 26 is identified after the vehicle 22 has started entering the parking area 28 in the forward direction FD, when the parking area 28 in the map of the navigation system 42 is specified as being for parking the vehicle 22 in the forward direction FD, when the computer 24 determines to park vehicle 22 in the forward direction FD based on the height H of the curb 26 and based on the front ground clearance FGC and the rear ground clearance RGC of the vehicle 22, etc.

The computer 24 may determine the parking position 30 based on the rear ground clearance RGC when the height H of the curb 26 is identified after the vehicle 22 has started entering the parking area 28 in the reverse direction RD, when the parking area 28 in the map of the navigation system 42 is specified as being for parking the vehicle 22 in the reverse direction RD, when the computer 24 determines whether to park vehicle 22 in the reverse direction RD based on the height H of the curb 26 and based on the front ground clearance FGC and the rear ground clearance RGC of the vehicle 22, etc.

The computer 24, upon determining that the height H of the curb 26 is greater than the front ground clearance FGC or the rear ground clearance RGC (depending on whether the vehicle 22 has started entering the parking area 28 in the forward or reverse direction RD, whether the parking area 28 is specified as being for parking the vehicle 22 in the forward or reverse direction RD, etc.), determines the parking position 30 as being a second distance from the curb 26. The second distance may be predetermined empirically, e.g., based on an amount of space sufficient to permit a pedestrian to fit between the front of the rear of the vehicle 22 at the parking position 30 and the curb 26. The second distance may be a minimum distance, e.g., that keeps the front or rear of the vehicle 22 from contacting the curb 26 and takes into account the accuracy of the sensors 40 of the vehicle 22. The second distance may be another predetermined amount. The second distance may be the same as the first distance. The second distance is stored in memory of the computer 24.

The computer 24, upon determining the height H of the curb 26 is not greater than (i.e., is less than) the front ground clearance FGC or the rear ground clearance RGC, identifies the parking position 30 based on the overhang length FOL, ROL of the front of the vehicle 22 or the rear of the vehicle 22 (depending on whether the vehicle 22 has started entering the parking area 28 in the forward direction FD or the reverse direction RD, whether the parking area 28 is specified as being for parking the vehicle 22 in the forward direction FD or the reverse direction RD, etc.). The computer 24 may determine the parking position 30 by comparing the front overhang length FOL or the rear overhang length ROL with the distance D between the curb 26 and the rear edge 48 of the parking area 28.

The computer 24, upon determining the respective front overhang length FOL or rear overhang length ROL is greater than the distance D between the curb 26 and the rear edge 48 of the parking area 28, determines the parking position 30 as being a third distance from the rear edge 48 of the parking area 28. The third distance may be predetermined empirically, e.g., based on an amount of space sufficient to permit a pedestrian to fit between the front of the rear of the vehicle 22 at the parking position 30 and the rear edge 48 of the parking area 28. The third distance may be a minimum distance, e.g., that keeps the front or rear of the vehicle 22 from overlapping the rear edge 48 and takes into account an accuracy of the sensors 40 of the vehicle 22. The third distance may be equal to a tolerance of the sensors 40. The third distance may be another predetermined distance. The third distance may be the same as the first distance and/or the second distance. The third distance is stored in memory of the computer 24.

In other words, the computer 24, upon determining the respective ground clearance FGC, RGC of the vehicle 22 is greater than the height H of the curb 26 and respective the overhang length FOL, ROL is greater than the distance D between the curb 26 and the rear edge 48 of the parking area 28, may determine the parking position 30 as being a same position as when the computer 24 determines the curb 26 borders the parking area 28.

The computer 24, upon determining the respective overhang length FOL, ROL is not greater than the distance D between the curb 26 and the rear edge 48 of the parking area 28, determines the parking position 30 based on a difference between the respective overhang length FOR, ROL and the distance D between the curb 26 and the rear edge 48. For example, the computer 24 may determine the parking position 30 using Equation 1:

$$PP=(OL-CD) \qquad \text{Equation 1.}$$

In Equation 1, "PP" is a distance (e.g., in centimeters) from the rear edge 48 of the parking area 28 to the parking position 30. "OL" is the respective overhang length FOL, ROL (e.g., in centimeters). "CD" is the distance between the curb 26 and the rear edge 48 of the parking area 28 (e.g., in centimeters).

The computer 24 is programmed to park the vehicle 22 at the parking position 30 within the parking area 28. The computer 24 parks the vehicle 22 by actuating the brake system 20, the propulsion system 32, and the steering system 36 in the autonomous mode, e.g., based on data from the sensors 40 and the navigation system 42. For example, the computer 24 may command the propulsion system 32 and the steering system 36 to propel the vehicle 22 into the parking area 28 between the side edges 50, and then actuate the brake system 20 to stop the vehicle 22 at the parking position 30. The computer 24 may further be programmed to execute more complicated maneuvers in the autonomous mode, e.g., to pass the parking area 28 in the forward direction FD and then enter the parking area 28 in the reverse direction RD.

The computer 24 may be programmed to limit output torque of the propulsion system 32 of the vehicle 22. Limiting the output torque limits an amount of forward force applied to the vehicle 22 by rotation of the wheels, e.g., inhibiting the vehicle 22 from driving over the curb 26. The computer 24 limits output torque by transmitting commands to the propulsion system 32. For example, the commands may limit an amount of volts provided to a motor, an amount of fuel injected into an engine cylinder, an amount of torque transferred through a clutch, etc. The commands may limit the torque to less than a threshold amount of torque, e.g., 300 Newton-meters. The threshold amount may be determined, e.g., by a manufacturer of the vehicle 22, based on empirical testing, computer modeling or the like, etc., indicating a minimum amount of torque necessary for propelling the vehicle 22 over a curb 26. The threshold amount is less than the minimum amount. The threshold amount is stored in memory of the computer 24.

The computer 24 may limit output torque of the propulsion system 32 of the vehicle 22 upon determining the vehicle 22 is within a threshold distance of the curb 26. The computer 24 determines whether vehicle 22 is within the threshold distance based on data from the sensors 40. For example, the computer 24 may compare the threshold distance with a distance between the vehicle 22 and the curb 26 as specified by data from a Lidar or radar sensor of the vehicle 22. The threshold distance is less than the length L of the parking area 28 and greater than a minimum detection distance of one or more of the sensors 40. The minimum detection distance is a minimum distance from the vehicle 22 at which one or more of the sensors 40 may detect the curb 26. In other words, the curb 26 may undetectable by one or more of the sensors 40 when the curb 26 is closer to the vehicle 22 than the minimum distance. Limiting output torque of the propulsion system 32 while the vehicle 22 is within the threshold distance of the curb 26 reduces a likelihood of the vehicle 22 overrunning the curb 26 when the curb 26 is undetectable by the sensors 40, e.g., when the curb 26 is under the front overhang 23 or the rear overhang 29.

The computer 24 may be programmed to determine whether the vehicle 22 is sufficiently within the parking area 28. The vehicle 22 is sufficiently within the parking area 28 when the vehicle 22 does not extend beyond the front edge 46 to outside of the parking area 28. In other words, the vehicle 22 is not sufficiently within the parking area 28 when the vehicle 22 extends from within to outside the parking area 28 over the front edge 46. The computer 24 determines whether the vehicle 22 is sufficiently within the parking area 28 by comparing a present location of the vehicle 22 with the parking position 30. The computer 24 may determine the vehicle 22 is sufficiently within the parking area 28 when the present location of the vehicle 22 is within a threshold distance of the parking location. The computer 24 may determine the vehicle 22 is not sufficiently within the parking area 28 when the present location of the vehicle 22 is not within the threshold distance of the parking location. The computer 24 determines the present location of the vehicle 22 based on data from the sensors 40 and the navigation system 42, e.g., relative to the map and objects detected by the sensors 40. The threshold amount may be determined by the computer 24 such that the vehicle 22 is fully within the parking area 28 when the present location of the vehicle 22 is within the threshold distance of the parking position 30. The computer 24 may determine the threshold distance as a difference between a length L2 of the vehicle 22 and a distance D2 between the parking position 30 and the front edge 48 of the parking area 28. The length L2 of the vehicle 22 may be pre-stored in memory of the computer 24, e.g., by a manufacturer of the vehicle 22. The computer may determine the distance D2 between the parking position 30 and the front edge 48 of the parking area 28 as a difference between the length L of the parking area 28 and the distance between the rear edge 48 and the parking position 30 or the distance from the parking position 30 to the curb 26 plus the distance D from the curb 26 to the rear edge 48.

Figure 4:
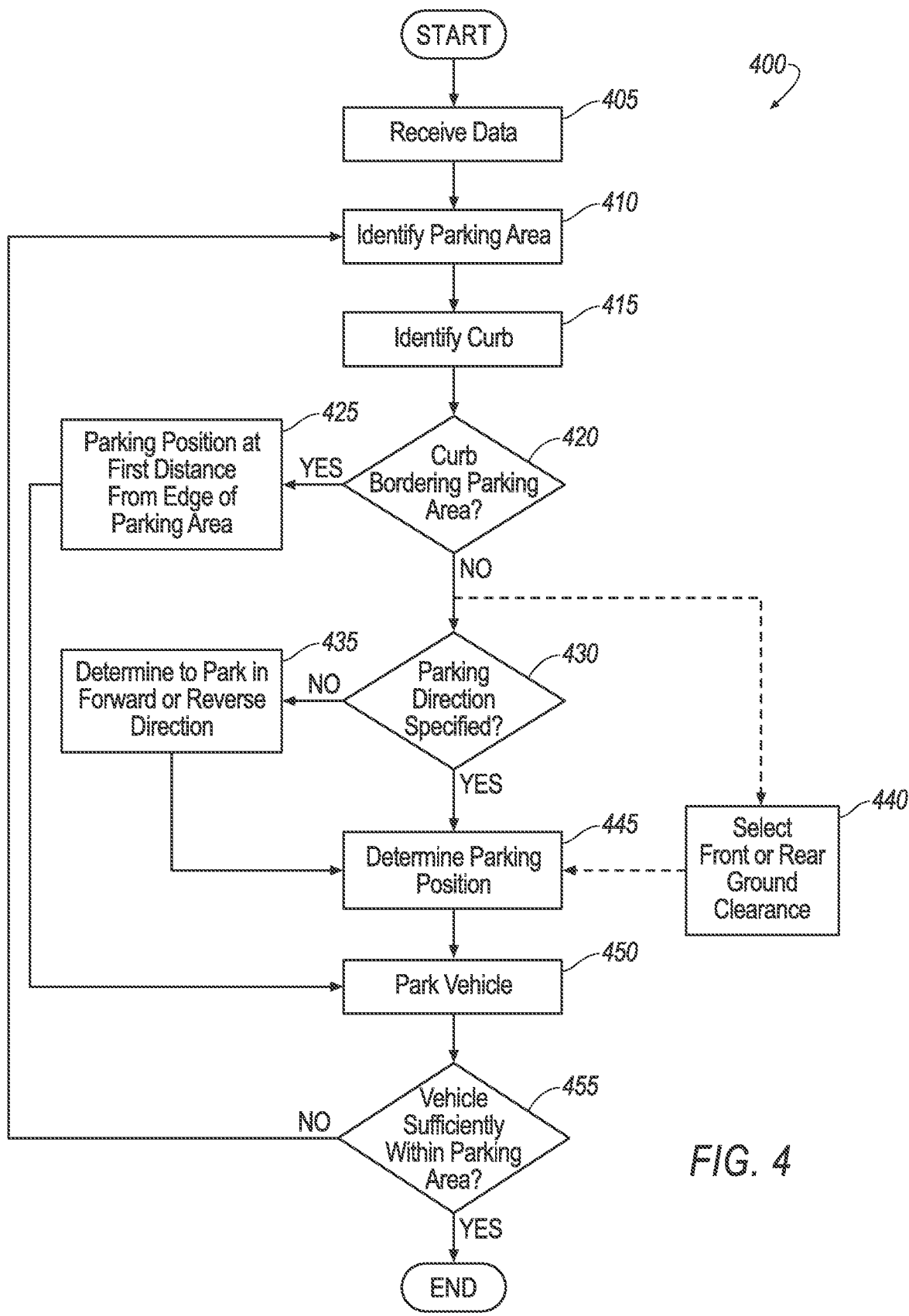
FIG. 4 is a flow chart illustrating a process for parking the vehicle.

FIG. 4 is a process flow diagram illustrating an exemplary process 400 for parking the vehicle 22. The process 400 begins in a block 405 where the computer 24 receives data, e.g., from the sensors 40 and the navigation system 42 via the communication network 44. The computer 24 may receive data substantially continuously or at intervals, e.g., every 100 milliseconds from various sensors 40 and the navigation system 42.

At a block 410 the computer 24 identifies a parking area 28. The computer 24 may identify the parking area 28 based on data from the navigation system 42, e.g., specifying the parking area 28 on the map stored in memory of the navigation system 42. The computer 24 may identify the parking area 28 based on data from the sensors 40, e.g., based on data from a camera and/or a LIDAR sensor and using conventional image recognition and object identification techniques. The computer 24 may identify the parking area 28 substantially continuously or at intervals, e.g., every 100 milliseconds, to update the parking area 28 as the sensors 40 collect additional data over time.

At a block 415 the computer 24 identifies a curb 26 that is at least one of within or bordering the parking area 28 identified at the block 410. The computer 24 identifies a height H and a location of the curb 26, e.g., a distance D between an edge 46, 48, 50 of the parking area 28 and the curb 26. The computer 24 identifies the curb 26, including the height H and location of the curb 26, based on data from the sensors 40, e.g., based on data from a camera and/or a Lidar sensor and using conventional image recognition and object identification techniques. The computer 24 may identify the curb 26 substantially continuously or at intervals, e.g., every 100 milliseconds, to update the location and/or height H of the curb 26 as the sensors 40 collect additional data over time.

At a block 420 the computer 24 determines whether the curb 26 identified at the block 415 borders the parking area 28 identified at the block 410. For example, the computer 24 may determine whether the curb 26 abuts a rear edge 48 of the parking area 28. The computer 24 may determine whether the curb 26 borders the parking area 28 by comparing the location of the curb 26 with the rear edge 48. Upon determining that the curb 26 borders the parking area 28 the process 400 moves to a bock 425. Upon determining that the curb 26 does not border the parking area 28, the process 400 moves to a block 430.

At the block 425 the computer 24 identifies the parking position 30 as being the first distance from the rear edge 48 of the parking area 28. After the block 425 the process moves to a block 450.

At a block 430 the computer 24 determines whether a parking direction FD, RD is specified for the parking area 28, e.g., based on map data specifying the parking area 28 stored, e.g., by the navigation system 42. For example, the data from the navigation system 42 may specify the forward direction FD or the reverse direction RD for the parking area 28. Upon determining a parking direction FD, RD is not specified for the parking area 28 the process 400 moves to a block 435. Upon determining that a parking direction FD or a parking direction RD is specified for the parking area 28, the computer 24 determines to park the vehicle 22 in the forward direction FD or the reverse direction RD as specified by the navigation system 42 and the process 400 moves to a block 445.

At the block 435 the computer 24 determines whether to park the vehicle 22 in the parking area 28 in the forward direction FD or the reverse direction RD based on the height H of the curb 26 and based on the front ground clearance FGC and the rear ground clearance RGC of the vehicle 22. The computer 24 determines the front ground clearance FGC and the rear ground clearance RGC, e.g., based on data specifying the ground clearances FGC, RGC stored in memory, based on data from the sensors 40, based on data from the suspension system 38, etc. The computer 24 compares the ground clearances FGC, RGC with the height H of the curb 26, and determines to park the vehicle 22 in the parking area 28 in the forward direction FD or the reverse direction RD based on whether the just one of the front ground clearance FGC or the rear ground clearance RGC is greater than the height H of the curb 26, or whether the front ground clearance FGC and the rear ground clearance RGC are both one of greater than or less than the height H of the curb 26. When just one of the front ground clearance FGC or the rear ground clearance RGC is greater than the height H of the curb 26 the computer 24 selects the one of the ground clearance FGC, RGC that is greater than the height H as dictating the parking direction FD, RD, i.e., when the front ground clearance FGC is greater the computer 24 selects the forward direction FD, and when the rear ground clearance RGC is greater the computer 24 selects the reverse direction RD. When the front ground clearance FGC and the rear ground clearance RGC are both one of greater than or less than the height H of the curb 26 the computer 24 selects the forward direction FD or the reverse direction RD based on a prestored direction in the memory of the computer 24 or a convenience direction. After the block 435 the process 400 moves to a block 445.

As an alternative to executing the blocks 430 and 435, the computer 24 may execute a block 440. The computer 24 may execute the block 440 instead of the blocks 430 and 435 when the vehicle 22 enters the parking area 28 in the forward direction FD or the reverse direction RD before identifying the curb 26 at the block 415.

At the block 440 the computer 24 selects the front ground clearance FGC or the rear ground clearance RGC for determining the parking position 30 based on whether the vehicle 22 is traveling in the forward direction FD or the reverse direction RD. The computer 24 may determine whether the vehicle 22 is traveling in the forward direction FD or the reverse direction RD based on data from the navigation system 42, e.g., specifying the forward direction FD or the reverse direction RD. The computer 24 may determine whether the vehicle 22 is traveling in the forward direction FD or the reverse direction RD based on data from the sensors 40, e.g., specifying a rotation direction of the wheels, whether the propulsion system 32 is in a forward gear or a reverse gear, etc. The computer 24 selects the front ground clearance FGC upon determining the vehicle 22 is traveling in the forward direction FD. The computer 24 selects the rear ground clearance RGC upon determining the vehicle 22 is traveling in the forward direction FD. After the block 440 the process 400 moves to the block 445.

At the block 445 the computer 24 determines the parking position 30 within the parking area 28 based on the height H of the curb 26, the location of the curb 26, and the front ground clearance FGC or the rear ground clearance RGC. The computer 24 uses either the front ground clearance FGC or the rear ground clearance RGC based on whether the forward direction FD or reverse direction RD is specified by the map at the block 430, whether the forward direction FD or reverse direction RD is determined at the block 435, or whether the front ground clearance FGC or the rear ground clearance RGC is selected at the block 440. The computer 24 determines the parking position 30 by comparing the height H of the curb 26 with the front ground clearance FGC or the rear ground clearance RGC (as prescribed by the block 430, 435, or 440). The computer 24 determines the parking position 30 is at the second distance from the curb 26 when the height H of the curb 26 is greater than the respective ground clearance FGC, RGC. When the height H of the curb 26 is less than the respective ground clearance FGC, RGC the computer 24 may determine the parking position 30 based on the front overhang length FOL or the rear overhang length ROL. The computer 24 uses the front overhang length FOL when the front ground clearance FGC is prescribed by the block 430, 435, or 440 and uses the rear overhang length ROL when the rear ground clearance RGC is prescribed by the block 430, 435, or 440. The computer 24 may determine parking position 30 by comparing the distance D between the rear edge 48 of the parking area 28 and the curb 26 with the respective overhang length FOL, ROL. The computer 24 determines the parking position 30 is at the third distance from the rear edge 48 when the respective overhang length FOL, ROL is greater than the distance D between the rear edge 48 and the curb 26. The computer 24 determines a distance from the rear edge 48 as the parking position 30 when the respective overhang length FOL, ROL is less than the distance D between the rear edge 48 and the curb 26, the determined distance based on the difference between the distance D between the rear edge 48 and the curb 26 and the respective overhang length FOL, ROL.

Next, at a block 450 the computer 24 parks the vehicle 22 at the parking position 30 within the parking area 28. The computer 24 parks the vehicle 22 in the autonomous mode by commanding the propulsion system 32 and the steering system 36 to navigate the vehicle 22 to the parking position 30 in the parking area 28, and then commands the brake system 20 to stop the vehicle 22 at the parking position 30. The computer 24 operates the vehicle 22 in the autonomous mode based on data from the sensors 40, e.g., using conventional techniques. The computer 24 may further operate the vehicle 22 based on data from the navigation system 42.

While parking the vehicle 22 the computer 24 may monitor a distance between the vehicle 22 and the curb 26, e.g., based on data from the sensors 40. The computer 24 may limit output torque of the propulsion system 32 of the vehicle 22 upon determining the vehicle 22 is within a threshold distance of the curb 26, e.g., by transmitting commands to the propulsion system 32 that limit the torque to less than a threshold amount of torque to inhibit the vehicle 22 from overrunning the curb 26.

At a block 455 the computer 24 determines whether the vehicle 22 is sufficiently within the parking area 28 by comparing a present location of the vehicle 22 with the parking position 30, e.g., based on data from the navigation system 42 and the sensors 40. For example, the computer 24 may compare a distance between the present location of the vehicle 22 and the parking position 30 and a determined threshold distance. The computer 24 may determine whether the vehicle 22 is sufficiently within the parking area 28 when the vehicle 22 stops within the parking area 28, e.g., upon detecting an object that prevents the vehicle 22 from navigating to the parking position 30. Upon determining the vehicle 22 is sufficiently within the parking area 28 the process 400 may end. Upon determined the vehicle 22 is not sufficiently within the parking area 28 the computer 24 may operate the vehicle 22 in the autonomous mode to exit the parking area 28 and the process may return to the block 410 to identify a new parking area 28.

With regard to the process 400 described herein, it should be understood that, although the steps of such process 400 have been described as occurring according to a certain ordered sequence, such process 400 could be practiced with the described steps performed in an order other than the order described herein. It further should be understood that certain steps could be performed simultaneously, that other steps could be added, or that certain steps described herein could be omitted. In other words, the description of the process 400 herein is provided for the purpose of illustrating certain embodiments and should in no way be construed so as to limit the disclosed subject matter.

Computing devices, such as the computer 24, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The adjectives "first," "second," "third," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer having a processor and a memory storing instructions executable by the processor to:
    identify a height of a curb that is at least one of within or bordering a parking area having a specified length and width;
    identify a location of the curb;
    determine a parking position within the parking area based on the height of the curb and the location of the curb; and
    park a vehicle at the parking position within the parking area, wherein the instructions include instructions to limit output torque of a propulsion system of the vehicle to an amount that is less than an amount necessary for driving the vehicle over the curb upon determining the vehicle is within a threshold distance of the curb.

2. The system of claim 1, wherein the instructions include instructions to identify the location of the curb including a distance between an edge of the parking area and the curb.

3. The system of claim 1, wherein the instructions include instructions to determine whether to park the vehicle in the parking area in a forward direction or a reverse direction based on the height of the curb.

4. The system of claim 3, wherein the instructions include instructions to determine whether to park the vehicle in the parking area in the forward direction or the reverse direction based on a front ground clearance and a rear ground clearance of the vehicle.

5. The system of claim 1, wherein the instructions include instructions to determine the parking position based on a ground clearance of the vehicle.

6. The system of claim 5, wherein the ground clearance is a front ground clearance or a rear ground clearance.

7. The system of claim 6, wherein the instructions include instructions to select the front ground clearance or the rear ground clearance for determining the parking position based on whether the vehicle is traveling in a forward direction or a reverse direction.

8. The system of claim 1, wherein the instructions include instructions to determine the parking position based on an overhang length of a front of the vehicle or a rear of the vehicle.

9. The system of claim 1, wherein the instructions include instructions to determine whether the vehicle is sufficiently within the parking area by comparing a present location of the vehicle with the parking position.

10. The system of claim 1, wherein the instructions include instructions to identify one or more edges of the parking area based on data from a camera or a LIDAR.

11. The system of claim 10, wherein the instructions include instructions to identify the one or more edges of the parking area based on a paint line or an object detected by the camera or LIDAR.

12. A system, comprising a computer having a processor and a memory storing instructions executable by the processor to:
    identify a height of a curb that is at least one of within or bordering a parking area having a specified length and width;
    identify a location of the curb;
    determine a parking position within the parking area based on the height of the curb and the location of the curb; and
    park a vehicle at the parking position within the parking area in a forward direction or a reverse direction based on the height of the curb.

13. The system of claim 12, wherein the instructions include instructions to identify the location of the curb including a distance between an edge of the parking area and the curb.

14. The system of claim 12, wherein the instructions include instructions to determine whether the vehicle is sufficiently within the parking area by comparing a present location of the vehicle with the parking position.

15. The system of claim 12, wherein the instructions include instructions to determine the parking position based on a ground clearance of the vehicle.

16. The system of claim 12, wherein the instructions include instructions to determine whether the vehicle is sufficiently within the parking area by comparing a present location of the vehicle with the parking position.

17. A system, comprising a computer having a processor and a memory storing instructions executable by the processor to:

identify a height of a curb that is at least one of within or bordering a parking area having a specified length and width;
identify a location of the curb;
determine a parking position within the parking area based on the height of the curb, the location of the curb, and an overhang length of a front of the vehicle or a rear of the vehicle; and
park a vehicle at the parking position within the parking area in a forward direction or a reverse direction based on the height of the curb.

18. The system of claim 17, wherein the instructions include instructions to identify the location of the curb including a distance between an edge of the parking area and the curb.

19. The system of claim 17, wherein the instructions include instructions to determine whether the vehicle is sufficiently within the parking area by comparing a present location of the vehicle with the parking position.

20. The system of claim 17, wherein the instructions include instructions to determine the parking position based on a ground clearance of the vehicle.

\* \* \* \* \*